United States Patent [19]

Huntley

[11] Patent Number: 4,552,995

[45] Date of Patent: Nov. 12, 1985

[54] PORTABLE CORDLESS PHONE HOLDER

[75] Inventor: James B. Huntley, Washington, D.C.

[73] Assignee: 2JT, Inc., Washington, D.C.

[21] Appl. No.: 515,250

[22] Filed: Jul. 9, 1983

[51] Int. Cl.$^4$ ............................................. H04M 1/02
[52] U.S. Cl. ...................................... 179/147; 179/157
[58] Field of Search .................. 179/146 R, 147, 157; 84/379

[56] References Cited

U.S. PATENT DOCUMENTS

| 1,250,716 | 12/1917 | Townsend | 179/157 |
| 1,304,718 | 5/1919 | Townsend | 179/157 |
| 2,644,043 | 6/1953 | Zakos | 179/157 |
| 2,785,234 | 3/1957 | Del Busto | 179/157 |
| 2,804,510 | 8/1957 | Sanford | 179/157 |
| 2,822,433 | 2/1958 | Sanford | 179/157 |

FOREIGN PATENT DOCUMENTS

| 545080 | 2/1956 | Belgium | 179/157 |
| 14118 | 1/1911 | Denmark | 179/157 |
| 365794 | 9/1921 | Fed. Rep. of Germany | 179/157 |

Primary Examiner—Gene Z. Rubinson
Assistant Examiner—L. C. Schroeder

[57] ABSTRACT

A portable, self contained, lightweight cordless phone holder is provided for the user to permit the free use of both hands and have virtual freedom of movement within the range of the unit while at the same time having ready access and use of the cordless phone. The mechanism is a device made of lightweight, malleable metal which permits it to be bent or adjusted to rest on the shoulder of the principle user just below the juncture of the neck and shoulders. The mallable metal permits the principle user to adjust the device for his individual body contours for the most comfortable position while being used.

The device is basically of a rectangular configuration shape comprised of two "L" shaped wire components, an obliquely vertical phone support extended vertically from one end of one of the "L" shaped components and adjusting strap attached to the other end of the other "L" shaped component. This strap permits the adjusting of the strap so that it holds the whole mechanism in place while the holder is being used. This mechanism provides for the freeing of both hands while using the cordless phone.

1 Claim, 5 Drawing Figures

PORTABLE CORDLESS PHONE HOLDER

This invention relates to a completely self contained cordless phone holder. More particularly, it relates to a cordless phone holder for use in the home, offices, motels, apartments buildings, etc. or any enviornment away from the main phone station but within the range of the main station where social interaction takes place whether social or economic in nature.

Other objects and advantge of the invention will be evident or pointed out in detail hereinafter, in connection with the accompanying drawing drawings, wherein there is shown by way of illustration and not of limitation, a preferred embodiment of the invention.

While the invention is susceptible of various modifications and alternative construction, it is shown in the drawings and will be hereinafter described in a preferred embodiment. It is not intended, however, that the invention is to be limited to the specific nor by the specific construction shown herein. On the contrary, it is intended to cover all modifications and all alternative constructions falling within the scope of the invention as definded in the appended claims.

Figure 1:
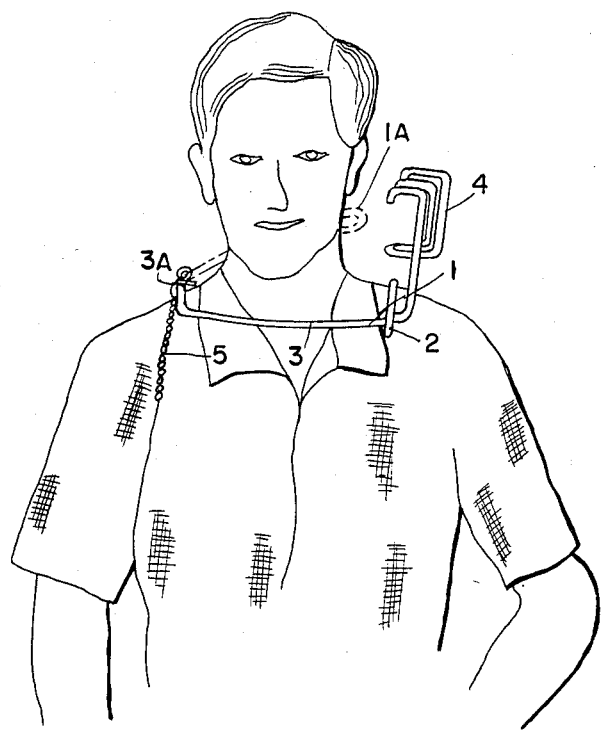
FIG. 1 is a front view of the phone holder positioned on the user.
Figure 2:
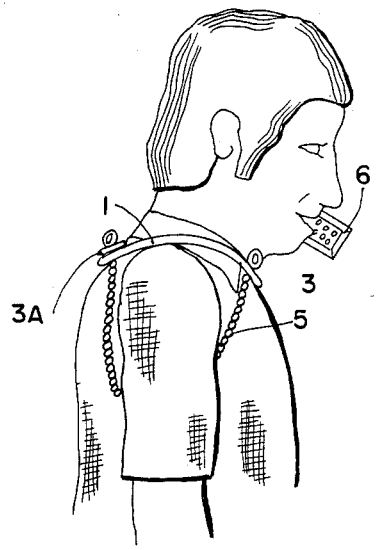
FIG. 2 is a right side view of the cordless phone holder showing how it fits over the right shoulder and connection of the adjusting shoulder strap under the right arm.
Figure 3:
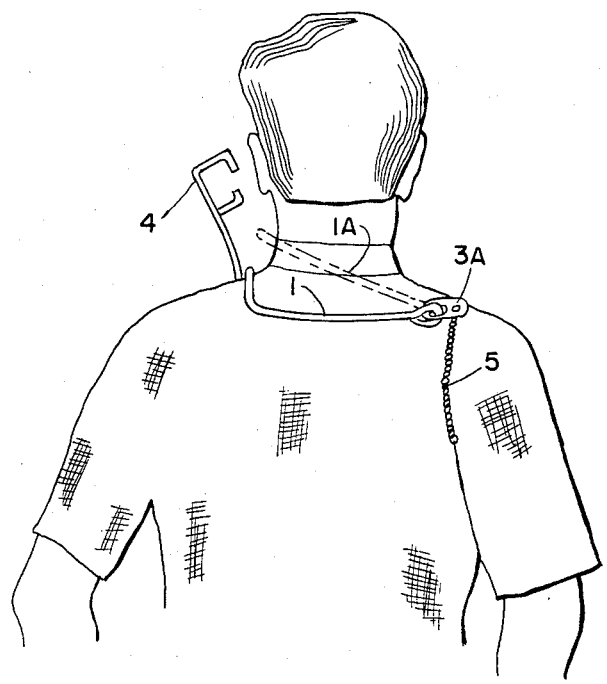

FIG. 3 is a rear view of the user showing the connection of the main two "L" shaped metal components and their connection which permits the rotation of the "across the back and over the left shoulder" portion by raising and lowering it to permit placing and removing of the device from the shoulders lowering it to permit placing and removing of the device from the shoulders for use and nonuse, respectively.

Figure 4:
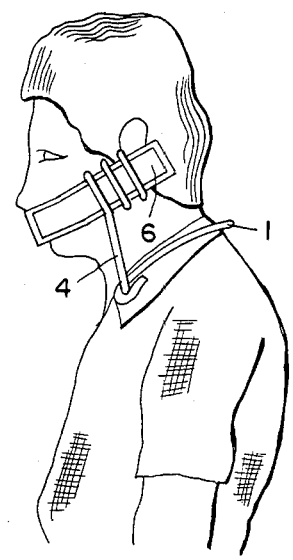

FIG. 4 is a right side view of the device on the user showing a phone in position on the phone holder and the hooked other end of the "L" shaped component in place for the operating mode.

Figure 5:
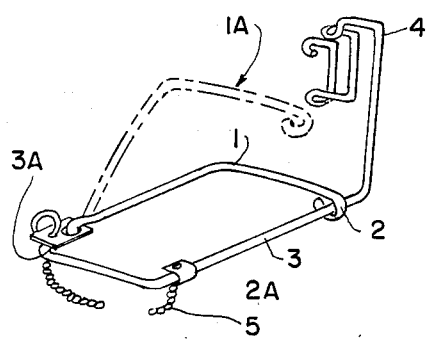

FIG. 5 is a general Isometric View of the entire mechanism.

As will be evident from the detailed description which follows, the cordless phone holder is characterized by its simplicity of construction and ease of operation.

Referring now more in detail to the drawings the device, the device of the present invention comprises essentially a basically rectangularly shaped device for resting on the shoulders of the user and made of two "L" shaped wire metal components 1 and 3 with a hinged connection 3A and an obliquely vertical cordless phone holder 4 or cradle attached to and extended from the long leg of 3. An adjusting strap 5 is also connected to hinged connection 3A to permit the user to pass the strap under the right arm pit from the rear and passing in an upward manner toward the front, up and over 3 at the juncture of the legs of 3, to the left of stud 2A so that it may be drawn downward through a floating metal clamp for adjusting to the various size persons and thus stabiling the entire mechanism for effective operation.

To initially operate the device the user raises 1 on its hinge at 3A to the position 1A and places the device over his shoulders and then lowers the device over his shoulders and then lowers 1A back to the 1 position and hooks it over 3 between stud 2 and the upright 4 for the portable phone holder, while at the same time having placed his right arm through the adjusting strap 5. With his left hand he pays the adjusting strap through the metal hasp thus taking up the slack or vice versa thereby adjusting for smaller or larger persons. This process stabilizes the device for immediate use. At this time, the portable phone is then placed in the portable phone phone holder 4 by placing the phone under the hooks at the top of 4 and twisted slightly into position for continuous operation. The reverse process is used to deactivate the holder after use.

What is claimed is:

1. An apparatus for holding a cordless phone comprising a first generally L-shaped wire having a short leg and a longer leg, wherein the shorter leg rests in front of the neck and across the chest of a user, the first L-shaped wire further including an extension from the longer leg including a bracket means for removably attaching a cordless telephone, a second L-shaped wire having a short and longer leg wherein the end of said longer leg is pivotally attached to the end of said shorter leg of said first L-shaped wire and wherein an end of said shorter leg of said second L-shaped wire is included a latch means for connection to the end of said longer leg of said first L-shaped wire thereby forming a rectangle with said first and second L-shaped wires and an adjustable strap means connected between the two ends of the short arm of said first L-shaped wire for fastening under the arm of the user.

* * * * *